United States Patent [19]
Hehl

[11] Patent Number: 5,159,957
[45] Date of Patent: Nov. 3, 1992

[54] COOLANT DISTRIBUTING AND FLOW CONTROL APPARATUS FOR MAINTAINING A CONSTANT TEMPERATURE-CONTROLLABLE REGION OF AN INJECTION MOLDING MACHINE

[76] Inventor: Karl Hehl, Arthur-Hehl-Str. 32, D-7298 Lossburg 1, Fed. Rep. of Germany

[21] Appl. No.: 747,148

[22] Filed: Aug. 19, 1991

[30] Foreign Application Priority Data

Sep. 1, 1990 [DE] Fed. Rep. of Germany ....... 4027791

[51] Int. Cl.⁵ .............................................. B29C 45/72
[52] U.S. Cl. ..................................... 137/883; 251/248; 62/201
[58] Field of Search ....................... 137/883, 884, 468; 251/248; 62/201

[56] References Cited

U.S. PATENT DOCUMENTS

3,974,857 8/1976 Hehl .
4,768,559 9/1988 Hehl .
4,815,693 3/1989 James et al. ......................... 251/14

Primary Examiner—John C. Fox
Attorney, Agent, or Firm—Spencer, Frank & Schneider

[57] ABSTRACT

The supply and return passages of the apparatus are defined by fittings, each of which defines also a valve passage, which contains a rotary valve for controlling the flow rate in a cooling circuit of the injection molding machine. A valve actuator is detachably mounted on each of said fittings and is operatively connected to said rotary valve. Each of said valve actuators is selectively constituted by a gearmotor housing, which contains a gearmotor for an automatic control of said rotary valve, or by an actuator housing of a manual drive. At least one of said fittings is provided with detachably mounted monitoring means, which comprise a temperature detector and/or a flow-sensing tube and communicate at one end through a tubular port of said fitting with said return passage section thereof and at the other end are provided with a hose coupling for connection to one of said cooling circuits.

17 Claims, 6 Drawing Sheets

COOLANT DISTRIBUTING AND FLOW CONTROL APPARATUS FOR MAINTAINING A CONSTANT TEMPERATURE-CONTROLLABLE REGION OF AN INJECTION MOLDING MACHINE

BACKGROUND OF THE INVENTION

1. Field of the Invention

This invention relates to a coolant distributing and flow control apparatus for maintaining a constant temperature in temperature-controllable regions of an injection molding machine, particularly in regions thereof in which said temperature is critical for the function of said machine, which apparatus is adopted to be connected to a plurality of cooling circuits, which branch from a common supply passage and open into a common return passage, which are defined by closely adjoining fittings, which are provided with tubular ports, which are adapted to be provided with hose couplings for connection to the cooling circuits, which apparatus also comprises rotary valves for controlling the flow in the cooling circuits, and may be provided with monitoring means for visually indicating the temperature in each of said regions and any deviation of said temperature from a desired value for each of said regions, which monitoring means are integrated in a unit which constitutes said apparatus.

2. Description of the Prior Art

In an apparatus of that kind, which is known from U.S. Pat. No. 3,974,857, the cooling circuits are designed for being manually controlled, the supply passage and the return passage of the apparatus are spaced apart by flow-sensing tubes, which constitute spacers, and said supply passage and return passage are defined each by a series of fittings.

A similar known apparatus is disclosed in U.S. Pat. No. 4,768,559 and is designed for an exclusively automatic control of the cooling circuits but does not take into account the fact that different accuracy requirements are to be met by the cooling in different temperature-controllable regions of the injection molding machine.

SUMMARY OF THE INVENTION

It is an object of the invention to provide an apparatus which is of the kind described first hereinbefore and is so designed that a cooling just to the required accuracy can be effected in injection molding machines arranged for different levels of automation so that a potential buyer of the apparatus can choose a coolant distributing and flow control apparatus which constitutes an optimum in view of his injection molding requirements and his financial capacity and that the competitive advantages which are thus afforded on the part of the manufacturer of the apparatus will not be offset by unreasonably high manufacturing costs of the apparatus.

In an apparatus which is of the kind described first hereinbefore that object is accomplished in accordance with the invention in that each of said fittings defines sections of both said supply and return passages and has between the supply passage section and the discharge passage section a valve passage, which crosses the supply and return passage sections at right angles and contains a rotary valve, a gearmotor housing containing a rotary motor drive or an actuator housing containing a manual rotary drive is adapted selectively to be mounted on each of said fittings, and at least one of said fittings is adapted to be provided with monitoring means, which are connected between the tubular port which communicates with the return passage section of said one fitting and the associated hose coupling.

Figure 3:
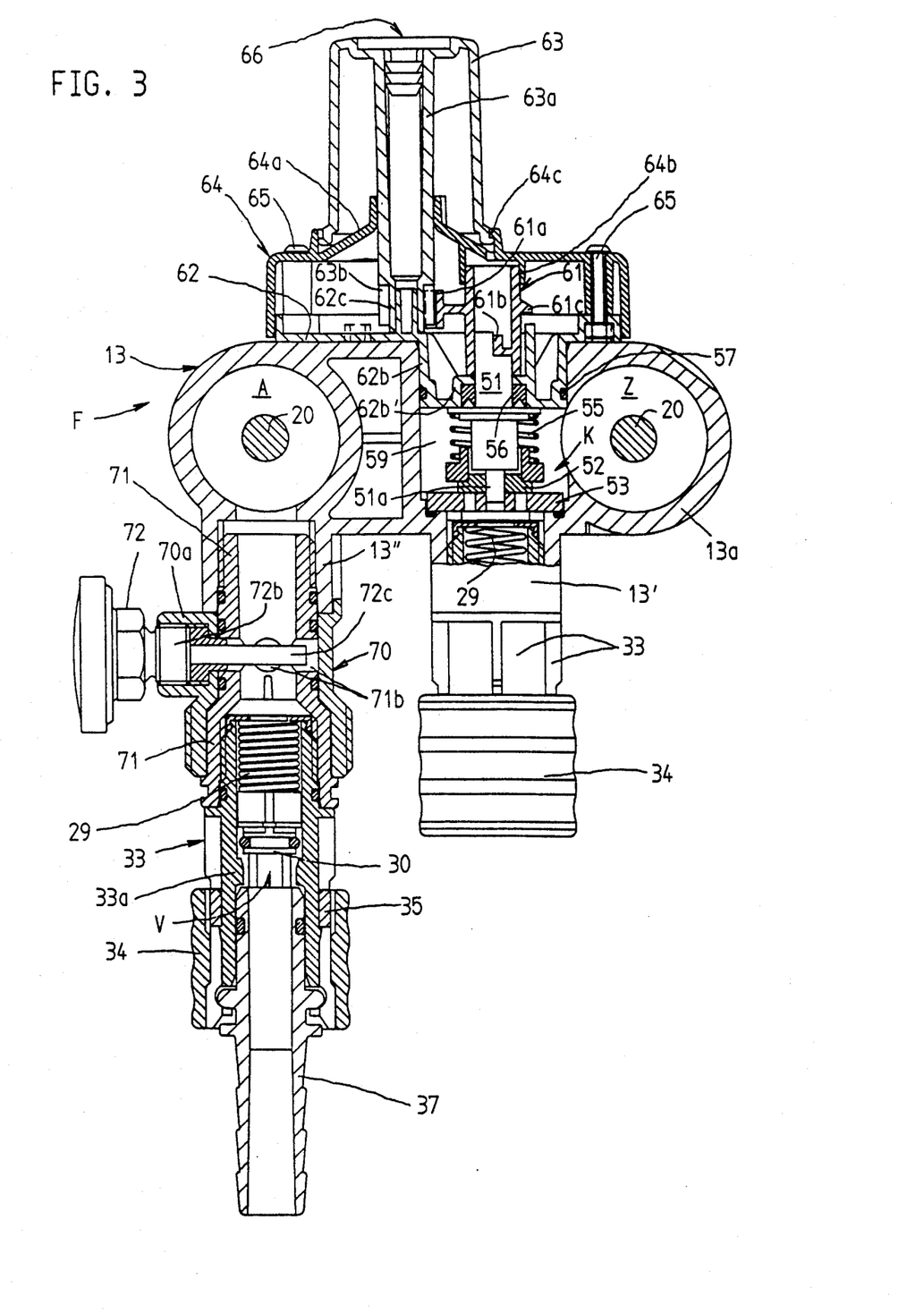
Figure 4:
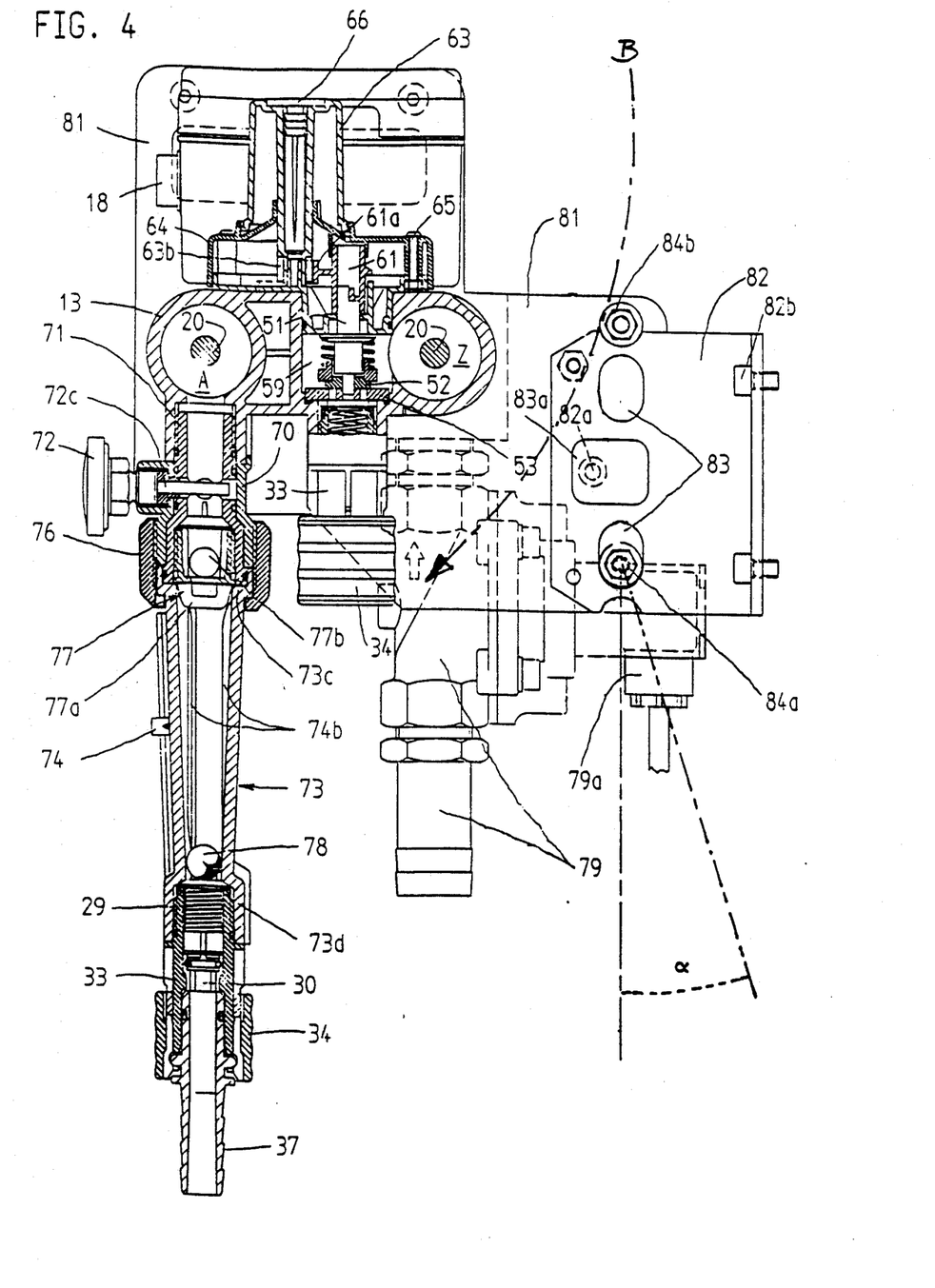
Figure 5:
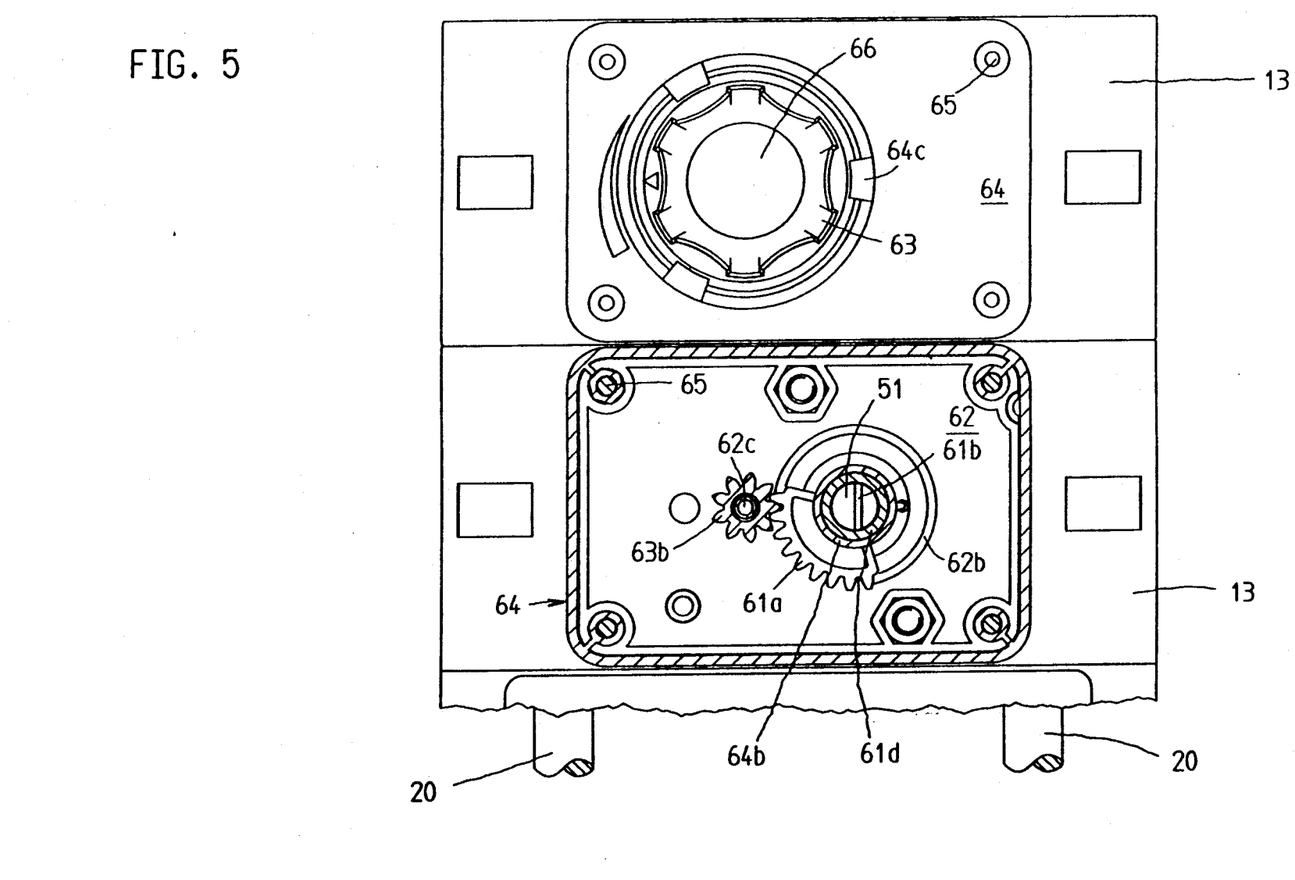
FIG. 5 is a sectional view taken on line V—V in FIG. 2.

Such an apparatus will permit a previously unachieved close adaptation to the specific requirements of a given customer not only at the time at which the apparatus is initially purchased but also for future developments because the customer may retrofit the apparatus in order to meet higher requirements as regards the quality of the injection-molded products and/or the level of automation and/or the operating convenience. In dependence on the magnitude of the deviations which are permissible from the desired temperature in various temperature-controllable regions of the injection molding machine, more or fewer cooling circuits may be provided with a motor-driven rotary valve for automatic control. The following options are provided for the manually controlled cooling circuits:

a) Cooling circuits which are not provided with monitoring means because only a very low accuracy of the cooling is required. In that case the coolant flow rate in the cooling circuit is set at the beginning of the operation to a value which has empirically been determined before.

b) The monitoring means consist only of a temperature detector (FIG. 3).

c) The monitoring means consist only of a flow-sensing tube.

d) The monitoring means comprise a temperature detector and a flow-sensing tube (FIG. 4).

The manufacturing costs can be kept very low because the injection-molded fittings defining the supply and return passages can be used for connection to the cooling circuits to be manually controlled and to the cooling circuits to be automatically controlled. For this reason only a relatively low assembling expenditure will be involved in an adaptation of the cooling apparatus to different cooling requirements. Whereas the flow-sensing tubes must be cleaned from time to time that cleaning will be simpler than the cleaning of the flow-sensing tubes in the known apparatuses, in which the flow-sensing tubes were connected between the supply and return passages. In the present apparatus the flow-sensing tube together with the hose couplings provided thereon can be removed from the apparatus simply in that the associated cap nut is unscrewed when the tube is to be cleaned. Option c) differs from option d) only in that the temperature detector has been omitted and the adapter sleeve and the carrier sleeve serve only for adaptation and for a coupling of passages.

The apparatus can be used to control a relatively large number of cooling circuits in an injection molding machine. The coolant flowing in the cooling circuits serves to cool or to control the temperature of temperature-controllable regions of the injection molding machine. Such regions through which a cooling circuit extends may be constituted by functional units and other portions of the machine and may consist, e.g., of the injection mold, which contains a mold cavity for receiving the plastic to be molded, of the cooler for the temperature control of the oil used in the hydraulic system of the injection molding machine, and of the receiving portion of the plasticizing cylinder of the injection molding machine, i.e., that portion of said cylinder which is supplied with plastic granules from a hopper.

BRIEF DESCRIPTION OF THE DRAWING

FIG. 3 shows a temperature detector and FIG. 4 shows a temperature detector and a flow-sensing tube.

DETAILED DESCRIPTION OF THE PREFERRED EMBODIMENTS

Illustrative embodiments of the invention will now be described more in detail with reference to the drawing.

The apparatus serves to maintain a constant temperature in each of several temperature-controllable regions of an injection molding machine by means of respective cooling circuits. Each cooling circuit branches from a common supply passage Z and opens into a common return passage A. The supply passage Z and the return passage A are defined by a series of closely adjoining and tightly interconnected plastic fittings F. Each fitting F is formed with a section 13a of the supply passage Z and with a section 13 of the return passage A. In each fitting F a valve passage 59 crosses the parallel sections 13a and 13 at right angles thereto and contains a rotary valve K for controlling the flow rate in the cooling circuit which is connected to the fitting F. Each fitting F is integrally formed with two tubular ports 13", 13'. The tubular port 13" extends radially to and communicates with the return passage section 13. The other tubular port 13' is coaxial to and communicates with the valve passage 59 and is parallel to the tubular port 13". The fittings F of the unit are in snug contact with each other by tie rods 20, which are made of special steel and coaxially extend through the fittings F in the supply passage Z and through the return passage A.

The rotary valve K comprises a stationary ceramic valve disk 53 and a movable ceramic valve disk 52, which is forced against the stationary disk 53 by an applied contact pressure and is adapted to be power-actuated or manually operated by means of a shaft 51, which is formed with a coupling projection 51a. The contact pressure is applied to the movable valve disk 52 by a prestressed coil spring 55, which surrounds the drive shaft 51. Each valve passage 59 communicates with the supply passage section 13a on one side of the valve K and with the tubular port 13' on the other side of the valve K.

Figure 2:
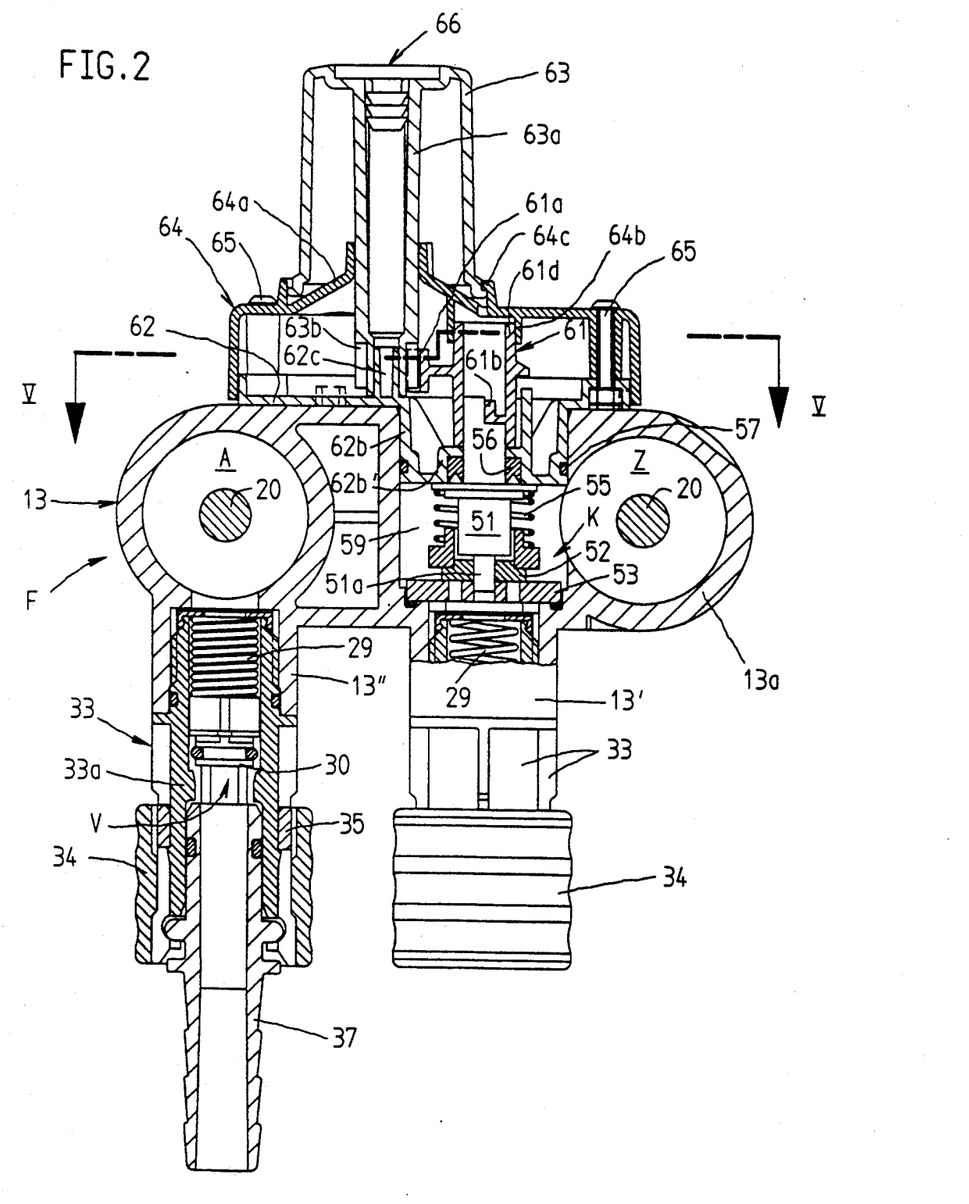
FIGS. 2, 3, and 4 are vertical sectional views showing the means provided adjacent to a manually controlled cooling circuit.

Each fitting F is selectively adapted to be provided with a detachably mounted actuator for the associated rotary valve K. That actuator may selectively consist either of a gearmotor housing 15, which contains a rotary drive motor, or of an actuator housing (consisting of a bearing plate 62 and a cover 64), which contains a manually operable rotary drive. At least one fitting F provided with a manually operable actuator for the valve may selectively be provided with monitoring means, which are tightly connected to the tubular port 13" and a hose coupling 37. The hose coupling 37 is adapted to be connected to a coupling sleeve 33. It is apparent from FIG. 2 that the hose coupling 37 and the coupling sleeve 33 are interconnected to form a connector, the coupling sleeve 33 of which is directly screw-connected to the tubular port 13". In the arrangement shown in FIG. 3 the coupling sleeve 33 of the connector consisting of the hose coupling 37 and the coupling sleeve 33 is screw-connected to an adapter sleeve 71, which carries a temperature detector 72 and is screwed to the tubular port 13".

In the arrangement shown in FIG. 4 the coupling sleeve 33 of the connector consisting of the hose coupling 37 and the coupling sleeve 33 is screw-connected to a flow-sensing tube 73, which is screw-connected to the adapter sleeve 71. The flow-sensing tube 73 is provided at its top and bottom with mounting flanges 73d and 73c and adjacent to its top flange 73c is screw-connected to the adapter sleeve 71 by a cap nut 76. A non-return valve 77 is mounted in the adapter sleeve 71. The temperature detector 72 is provided with a screw-in tubular port 72b and comprises a linear temperature sensor 72c and is held in a radial projection 70a, which is integrally formed with a carrier sleeve 70, which surrounds the adapter sleeve 71. The carrier sleeve 70 is axially held in position between a shoulder of the tubular port 13" and a radial shoulder of the adapter sleeve 71. The latter is formed with two bores 71b, which extend at right angles to each other and are adapted to selectively receive the screwed-in temperature sensor 72c in different sensing positions.

The coupling sleeve 33 is provided with a shut-off valve V, which closes automatically in response to a removal of the hose coupling 37 from the coupling sleeve 33. When the hose coupling 37 is connected to the coupling sleeve 33 by means of the collet chuck 35 and the clamping ring 34, the valve member 30 of the shut-off valve V is held at a distance from the valve seat 33a of the valve V against the force of a spring 29. Rotary valves K for an automatic control of at least two cooling circuits are actuated in accordance with a program-controlled computer, which is accommodated in an empty gearmotor housing 15' of the apparatus and is operatively connected to the computer for controlling the injection molding machine which is to be cooled. The output signals from the program-controlled computer control the motor-driven actuators for the rotary valves. The empty gearmotor housing 15' is mounted on a fitting F, which is not connected to a cooling circuit.

At least two further cooling circuits connected to the apparatus are manually controlled and the associated rotary valves are adapted to be actuated by associated rotary knobs 63. The operator for controlling the rotary valves associated with the manually controlled cooling circuits will read means for monitoring said cooling circuits and will actuate the rotary valve associated with a given cooling circuit when the monitoring means indicate that the temperature in the associated temperature-controllable region of the injection molding machine deviates from a desired value. Such monitoring means may comprise a temperature detector and indicator 72 known per se and a flow-sensing tube 73 known per se, which is provided with an indicating float 74.

Figure 6:
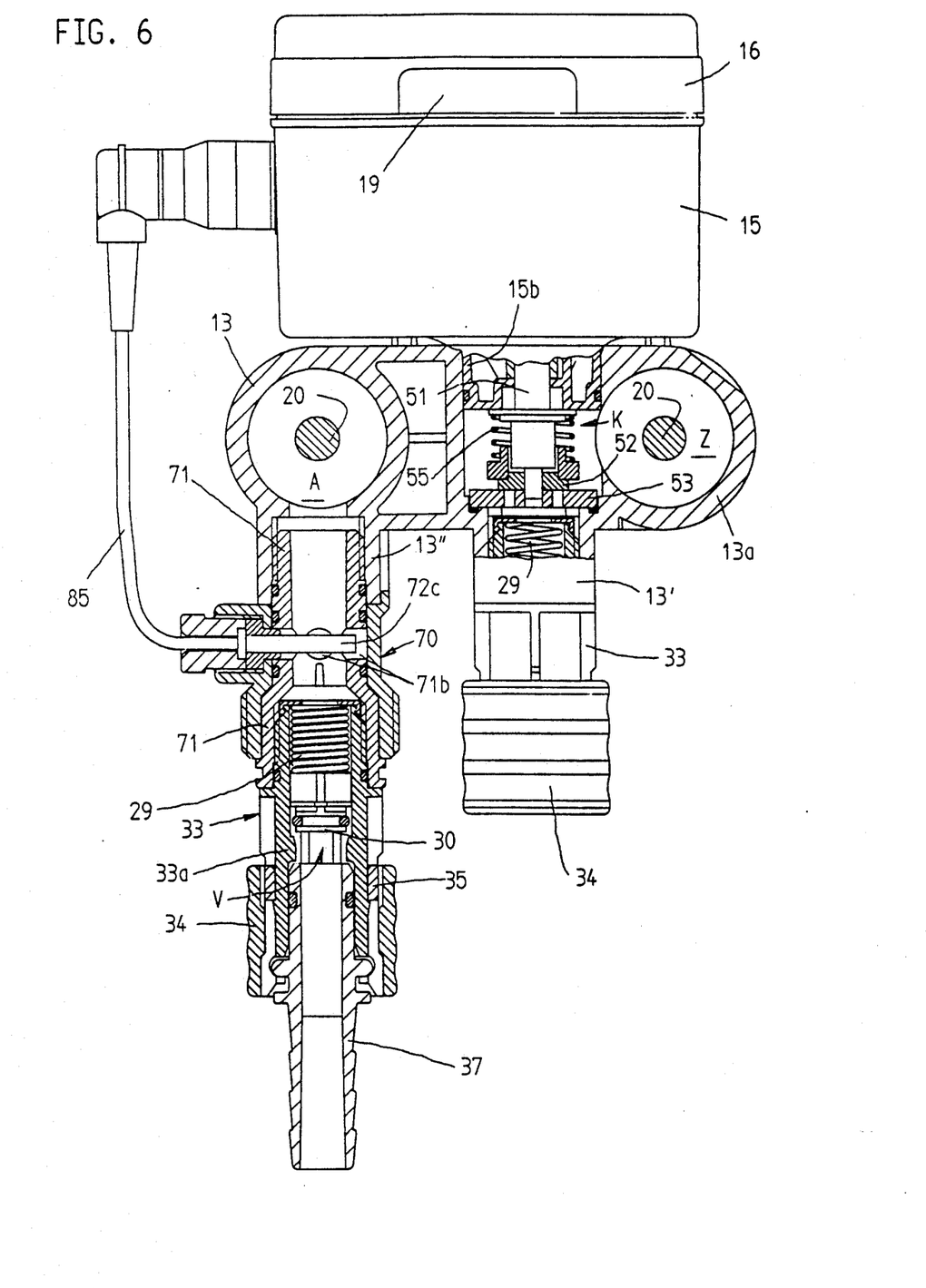
FIG. 6 is a fragmentary vertical sectional view showing the means provided adjacent to an automatically controlled cooling circuit.

The actuator for each fitting F that contains a manually operable rotary valve comprises an actuator housing that comprises a bearing plate 62 and a cover 64. The bearing plate 62 is integrally formed with an extension 62b, which extends into and is centered in the valve passage 59 of the associated fitting F. Each fitting F which contains an automatically controlled rotary valve K is provided with a detachably mounted actuator comprising a gearmotor housing 15, which is integrally formed with an extension 15b (FIG. 6), which extends into and is centered in the valve passage 59 of the fitting. Adjacent gearmotor housings 15 are electrically interconnected by plug connectors 19. Leads from the temperature sensors 72c are connected to plug receptacles 18. Signals representing the actual temperature are transmitted from the temperature sensor 72c via a lead 85 to the gearmotor housing 15 (FIG. 6).

A manual actuator for a rotary valve K comprises a rotary knob 63, which is provided with a central drive pin 63a, which is covered by a sealing plug 66. The rotary knob 63 is connected by elastic detent tongues 64c to the cover 64 of the actuator housing. The central drive pin 63a is rotatably mounted in the housing cover 64c and is centered on a pin 62c of the bearing plate 62. A pinion 63b which is non-rotatably connected to or integral with the drive pin 63a meshes with a gear segment 61a, which is non-rotatably connected to a drive sleeve 61, which is coupled to the drive shaft 51 of the rotary valve K by a coupling portion 61b, which is integral with the drive sleeve 61. The drive sleeve 61 is centered by means of a centering bearing on the housing cover 64 and is supported on the bottom portion 62b' of the coupling projection 62b. Sealing rings are designated 56 and 57. The housing cover 64 is detachably connected to the fitting F by fasteners 65.

In the operation of the apparatus the cooling water flows through the supply passage Z into the valve passages 59 and further through the rotary valves K and the tubular ports 13" into respective cooling circuits. When the cooling water has flown through the temperature-controllable regions of the injection molding machine the heated cooling water flows through the hose couplings 37 through any monitoring means (flow-sensing tubes 73, temperature detectors 72) and further into the return passage A.

As a flow-sensing tube 73 is removed, e.g., for being cleaned, the associated non-return valve 77 is closed in that the pressure of the cooling water urges a valve ball 77b against an associated valve seat in the valve housing 77a.

The desired level of the float ball 78 in the flow-sensing tube 73 corresponds to the flow rate of the cooling water required for a desired temperature. That desired level can be visually be indicated by a marker 74, which is vertically slidably mounted on the tube 73. The float 78 is guided by vertical ribs 74b provided on the inside surface of the flow-sensing tube.

The entire distributor can be shut off by a solenoid valve, which has an electric terminal 79a.

Figure 1:
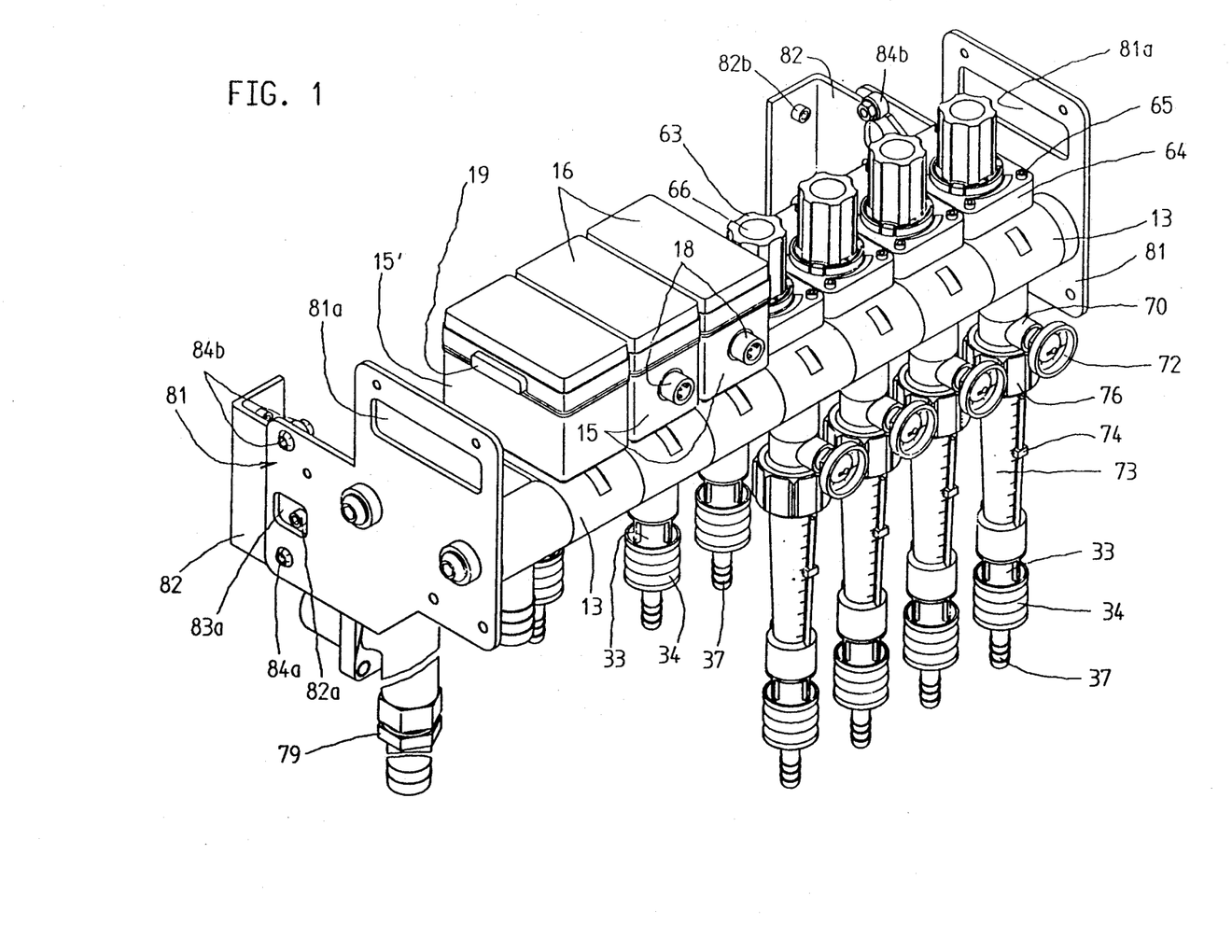
FIG. 1 is a perspective view showing a unit which constitutes the coolant distributing and flow control apparatus.

As is particularly apparent from FIG. 1 the distributing and flow control unit is covered at both ends by plates 81, which can be used to fix that unit by means of screws 82b to angle brackets 82 of the injection molding machine. The mounting means are so designed that the unit is pivotally movable from a normal position, which is shown in FIG. 1 and in which the flow-sensing tubes 73 are vertical, about a rotary bearing disk 84a to a position in which the flow-sensing tubes 73 include an angle α (FIG. 4) with the vertical. The pivotal movement is limited in that a stop 82a of the angle bracket 82 engages the edges of an aperture 83a in the plate 81. The unit is fixed in its normal position by means of a fixing screw 84b, which extends into an aperture of the angle bracket 82. To release the unit, the latter can be raised to an extent which is defined by the slots 83 of the angle bracket 82 so that when the unit has been turned through the angle α the rear hose couplings 37 can be more easily connected to the rear coupling sleeves 33 because the hand used to couple them can more easily reach to the rear clamping rings 34 along the path which is indicated by the arrow B (FIG. 4) between the injection molding machine and the distributing apparatus when the latter is in an inclined position.

The end plates 81 are formed with grip apertures 81a.

I claim:

1. In a coolant distributing and flow control apparatus for use with an injection molding machine having a plurality of temperature-controllable regions and provided with a plurality of cooling circuits for conducting a coolant through respective ones of said regions, said apparatus comprising:

a series of fittings closely adjoining and tightly connected to each other; each said fitting defining a supply passage section and a return passage section generally parallel to and laterally spaced from said supply passage section; each said fitting having a first tubular port communicating with said supply passage section and a second tubular port communicating with said return passage section, said first and second ports of each said fitting being adapted to be connected to one of said cooling circuits at opposite ends thereof; each said fitting having valve means for controlling a flow of coolant between one of said passage sections and that of said tubular ports which communicates with said one passage section;

said supply passage sections of all said fittings being connected in series to form a supply passage and said return passage sections of all said fittings being connected in series to form a return passage;

the improvement wherein each said fitting has a valve passage extending between and crossing said supply and return passage sections at right angles thereto and a first portion communicating with said one passage section and a second portion communicating with that of said tubular ports which communicates with said one passage section;

said valve means comprising a plurality of rotary flow control valves, each contained in one of said valve passages between said first and second portions thereof; each rotary flow control valve being operable to control a flow rate in said valve passage; said valve means further comprising a plurality of valve actuators each being detachably mounted on one of said fittings and being operatively connected to the rotary valve provided in said one fitting;

at least one of said actuators comprising an actuator housing detachably mounted on one of said fittings, and a manually accessible rotary knob rotatably mounted in said actuator housing and operatively connected to said rotary valve contained in said one fitting; at least one of said actuators further comprising a gearmotor housing detachably mounted on another one of said fittings and accommodating a gearmotor operatively connected to said rotary valve contained in said other fitting;

said actuator housing comprising a bearing plate having an extension; a housing cover having means for yieldably holding said rotary knob in an adjusted rotational position; a central drive pin non-rotatably connected to said rotary knob and to a pinion;

said gearmotor housing having an extension being identical to said extension of said actuator housing; each extension being fitted in one of said fittings to center the associated housing on said fitting; and said rotary valve comprising a drive shaft non-rotatably connected to a drive sleeve; said drive sleeve being non-rotatably connected to a gear segment in mesh with said pinion.

2. The improvement set forth in claim 1, wherein each of said fittings provided with a gearmotor housing is provided in said second tubular port with a temperature sensor, which is responsive to the temperature of said coolant flowing into said second tubular port, said series of fittings comprise an additional one of said fittings, which is not provided with one of said actuators and is provided with a housing, which is similar to said gearmotor housings and contains a computer, which is operatively connected to said temperature sensor.

3. The improvement set forth in claim 1, wherein at least two of said fittings are provided each with one of said gearmotor housings and at least two of said fittings are provided each with one of said actuator housings.

4. The improvement set forth in claim 1 as applied to such apparatus for maintaining a desired parameter of said coolant in each of said temperature-controllable zones, wherein at least one of said fittings is provided with monitoring means, which are connected to said second tubular port of said one fitting and adapted to be connected to the associated one of said cooling circuits and adapted to monitor said parameter in said coolant flowing from said cooling circuit to said second tubular port of said one fitting.

5. The improvement set forth in claim 4, wherein said monitoring means comprise a temperature detector for monitoring the temperature of said coolant.

6. The improvement set forth in claim 4, wherein said monitoring means comprise a flow-sensing tube for monitoring the flow rate of said coolant.

7. The improvement set forth in claim 6, wherein said flow-sensing tube is provided with a slidably mounted marker and is screw-connected by means of a cap nut to said adapter sleeve and said adapter sleeve contains a non-return valve.

8. The improvement as set forth in claim 4, wherein at least one of said monitoring means comprises a set point adjuster for adjusting a desired value of said parameter in said coolant flowing from said cooling circuit to said second tubular port of said one fitting and is adapted to detect any deviation of said parameter from said desired value.

9. The improvement set forth in claim 4, wherein at least one of said fittings provided with such actuator housings is provided with such monitoring means, which comprises a set point adjuster for adjusting a desired value of said parameter in said coolant flowing from said cooling circuit to said second tubular port of said one fitting and is adapted to visibly indicate any deviation of said parameter from said desired value.

10. An apparatus as defined in claim 1, wherein said means for yieldably holding said rotary knob comprises an annular series of detent tongues.

11. In a coolant distributing and flow control apparatus for use with an injection molding machine having a plurality of temperature-controllable regions and provided with a plurality of cooling circuits for conducting a coolant through respective ones of said regions, said apparatus comprising:

a series of fittings closely adjoining and tightly connected to each other; each said fitting defining a supply passage section and a return passage section generally parallel to and laterally spaced from said supply passage section; each said fitting having a first tubular port communicating with said supply passage section and a second tubular port communicating with said return passage section, said first and second tubular ports of each said fitting being adapted to be connected to one of said cooling circuits at opposite ends thereof; each said fitting having valve means for controlling a flow of coolant between one of said passage sections and that of said tubular ports which communicates with said one passage section;

said supply passage sections of all said fittings being connected in series to form a supply passage and said return passage sections of all said fittings being connected in series to form a return passage;

the improvement wherein each said fitting has a valve passage extending between and crossing said supply and return passage sections at right angles thereto and a first portion communicating with said one passage section and a second portion communicating with that of said tubular ports which communicates with said one passage section;

said valve means comprising a plurality of rotary flow control valves, each contained in one of said valve passages between said first and second portions thereof; each rotary flow control valve being operable to control a flow rate in said valve passage; said valve means further comprising a plurality of valve actuators each being detachably mounted on one of said fittings and being operatively connected to the rotary valve provided in said one fitting;

further comprising two hose couplings detachably connecting said first and second tubular ports of said fittings to one of said cooling circuits; each of said hose couplings being detachably connected to a coupling sleeve, communicating with said second tubular port of one of said fittings;

at least one of said fittings having monitoring means connected to said second tubular port of said one fitting and adapted to be connected to the associated one of said cooling circuits for monitoring a parameter in said coolant flowing from said cooling circuit to said second tubular port of said one fitting; and at least one of said coupling sleeves being detachably connected to an associated adapter sleeve forming part of the monitoring means and being detachably connected to said second tubular port of one of said fittings.

12. The improvement set forth in claim 11 as applied to such apparatus for maintaining a desired parameter of said coolant in each of said temperature-controllable zones, wherein at least one of said fittings is provided with monitoring means, which are connected to said second tubular port of said one fitting and adapted to be connected to the associated one of said cooling circuits and adapted to monitor said parameter in said coolant flowing from said cooling circuit to said second tubular port of said one fitting, and each of said monitoring means is adapted to be connected to one of said cooling circuits by one of said hose couplings.

13. The improvement set forth in claim 11, wherein said monitoring means associated with at least one of said fittings comprise a temperature detector, which is mounted on said adapter sleeve.

14. The improvement set forth in claim 11, wherein said monitoring means associated with at least one of said fittings comprise a flow-sensing tube, which is detachably connected between said coupling sleeve and said adapter sleeve.

15. The improvement set forth in claim 11, wherein
said one tubular port of said one fitting is formed with a radial surface facing said adapter sleeve,
said adapter sleeve is formed with a radial surface facing said one tubular port,
a carrier sleeve is provided, which surrounds said adapter sleeve and engages and is axially retained by said radial surfaces, and
said temperature detector comprises a linear temperature sensor, which is mounted in said carrier sleeve and extends radially through said adapter sleeve.

16. The improvement set forth in claim 11, wherein
at least one of said actuators comprise a gearmotor housing, which is detachably mounted on another one of said fittings and contains a gearmotor, which is operatively connected to said rotary valve contained in said other fitting,
at least one of said fittings provided with a gearmotor housing is provided with such adapter sleeve and with monitoring means comprising a linear temperature sensor,
said adapter sleeve of said one fitting is formed with two radial bores, which are at right angles to each other, and
said temperature sensor extends in one of said bores and is adapted to extend in the other of said bores when said adapter sleeve is in a different rotational position relative to said second port of said one fitting.

17. In a coolant distributing and flow control apparatus for use with an injection molding machine having a plurality of temperature-controllable regions and provided with a plurality of cooling circuits for conducting a coolant through respective ones of said regions, said apparatus comprising:

a series of fittings closely adjoining and tightly connected to each other; each said fitting defining a supply passage section and a return passage section generally parallel to and laterally spaced from said supply passage section; each said fitting having a first tubular port communicating with said supply passage section and a second tubular port communicating with said return passage section, said first and second ports of each said fitting being adapted to be connected to one of said cooling circuits at opposite ends thereof; each said fitting having valve means for controlling a flow of coolant between one of said passage sections and that of said tubular ports which communicates with said one passage section;

said supply passage sections of all said fittings being connected in series to form a supply passage and said return passage sections of all said fittings being connected in series to form a return passage;

the improvement wherein each said fitting has a valve passage extending between and crossing said supply and return passage sections at right angles thereto and a first portion communicating with said one passage section and a second portion communicating with that of said tubular ports which communicates with said one passage section; said tubular ports extending parallel to one another;

said valve means comprising a plurality of rotary flow control valves, each contained in one of said valve passages between said first and second portions thereof; each rotary flow control valve being operable to control a flow rate in said valve passage; said valve means further comprising a plurality of valve actuators each being detachably mounted on one of said fittings and being operatively connected to the rotary valve provided in said one fitting; and further comprising a swiveling disk for mounting the coolant distributing and flow control apparatus on an injection molding machine for a pivotal movement thereon from a normal position in which said tubular ports are vertically oriented, to an inclined position in which said tubular ports are oriented at an acute angle to the vertical.

* * * * *